United States Patent
Severinsson

(10) Patent No.: US 6,851,533 B2
(45) Date of Patent: *Feb. 8, 2005

(54) SPRING BRAKE ACTUATOR

(75) Inventor: Lars Severinsson, Hishult (SE)

(73) Assignee: Haldex Brake Products AB (SE)

( * ) Notice: Subject to any disclaimer, the term of this patent is extended or adjusted under 35 U.S.C. 154(b) by 0 days.

This patent is subject to a terminal disclaimer.

(21) Appl. No.: 10/600,731

(22) Filed: Jun. 20, 2003

(65) Prior Publication Data

US 2004/0055838 A1 Mar. 25, 2004

Related U.S. Application Data

(63) Continuation of application No. PCT/SE01/02808, filed on Dec. 18, 2001.

(30) Foreign Application Priority Data

Dec. 20, 2000 (SE) ................................................ 0004716

(51) Int. Cl.⁷ .......................... B60T 13/04; F16D 65/34
(52) U.S. Cl. ..................... 192/12 R; 185/38; 185/40 B; 188/158; 188/167; 192/90
(58) Field of Search ........................... 192/219.4, 12 B, 192/12 BA, 12 R, 12 D, 90; 188/158, 171, 162, 173, 166, 167; 185/38, 40 B

(56) References Cited

U.S. PATENT DOCUMENTS

| | | | |
|---|---|---|---|
| 2,430,405 A | * 11/1947 | Millns ............................ | 318/1 |
| 3,217,843 A | * 11/1965 | Newell et al. ............... | 188/173 |
| 3,280,944 A | * 10/1966 | Kyllonen ..................... | 188/171 |
| 3,693,759 A | * 9/1972 | Schindel .................... | 185/40 R |
| 4,953,668 A | * 9/1990 | Severinsson ................ | 188/158 |
| 4,953,669 A | * 9/1990 | Severinsson ................ | 188/171 |
| 5,388,674 A | * 2/1995 | Severinsson ................ | 188/171 |
| 2004/0060783 A1 | * 4/2004 | Severinsson ................ | 188/166 |

FOREIGN PATENT DOCUMENTS

| | | | |
|---|---|---|---|
| DE | 198 51 668 A1 | * | 5/2000 |
| WO | WO 03/052286 A1 | * | 6/2003 |

* cited by examiner

Primary Examiner—Rodney H. Bonck
(74) Attorney, Agent, or Firm—St. Onge Steward Johnston & Reens LLC

(57) ABSTRACT

A spring brake actuator is mounted with its shaft connected to the rotational operative shaft of a service brake actuator. The spring brake actuator has a clock spring, which is mechanically charged at a rotation of the actuator shaft in a brake release direction. It also has an electric coil for keeping when electrically energized—the clock spring in its charged condition. Further, it has means for transferring the rotative energy of the clock spring to the actuator shaft in a brake applying direction, when the coil is energized, but allowing free rotation of the shaft in either direction, when the coil is energized.

7 Claims, 2 Drawing Sheets

SPRING BRAKE ACTUATOR

This application is a continuation of pending International Patent Application No. PCT/SE01/02808 filed Dec. 18, 2001, which designates the United States and claims priority of pending Swedish Application No. 0004716-7 filed Dec. 20, 2000.

FIELD OF THE INVENTION

The present invention relates to a spring brake actuator for use in conjunction with a service brake actuator having a rotational operative shaft, the spring brake actuator having an actuator shaft in rotative communication with the service brake actuator shaft.

BACKGROUND OF THE INVENTION

A service brake actuator with an electric motor as its energizing means is known. The rotating movement of the motor shaft is transformed into a linear, brake applying movement of brake linings or the like, cooperating with a brake disc or a brake drum of a vehicle, such as a road vehicle or a rail vehicle.

For such a service brake actuator it is of importance to attain a parking braking, when the vehicle is parked and the service brake actuator is electrically deenergized. It may also be important to have the brakes applied in the case of failure in the supply of electricity to the service brake actuator.

It is well known in the art to make use of a powerful spring in a spring brake actuator for the purpose of obtaining parking and emergency braking. In the case with a rotational operative shaft of the service brake actuator, it is obviously suitable to have a spring brake actuator shaft connected to or in rotative communication with the service brake shaft.

SUMMARY OF THE INVENTION

A spring brake actuator, which can be mechanically charged by the service brake actuator and will provide a brake applying force at will or at the disruption of voltage supply, is according to the invention characterized a clock spring or spiral spring, attached at its outer end to a spring brake actuator housing and mechanically charged at a rotation of the actuator shaft in a brake release direction, an electric coil for keeping—when electrically energized—the clock spring in its charged condition, and transfer means for transferring the rotative energy of the clock spring to the actuator shaft in a brake applying direction, when the coil is deenergized, but allowing free rotation of the shaft in either direction, when the coil is energized.

Preferably the transfer means include a cylindrical hub, which is rotationally arranged in relation to the shaft and to which the inner end of the clock spring is attached, a locking spring connecting the hub with the shaft, and control means for controlling the operational condition of the locking spring in relation to the hub by means of the coil.

In a practical embodiment the control means include in axial order a brake disc in proximity to the coil and in splines engagement with the hub, a plate attached to the actuator housing, and a control disc in internal engagement with the locking spring.

Herein, the locking spring may be connected to the hub by means of a sleeve having a certain circumferential play in relation to the hub. This circumferential play can be obtained in that the sleeve has a pin engaging a circumferential groove in the hub.

BRIEF DESCRIPTION OF THE DRAWINGS

The invention will be described in further detail below under reference to the accompanying drawings, in which.

DETAILED DESCRIPTION OF THE DRAWINGS

Figure 1:
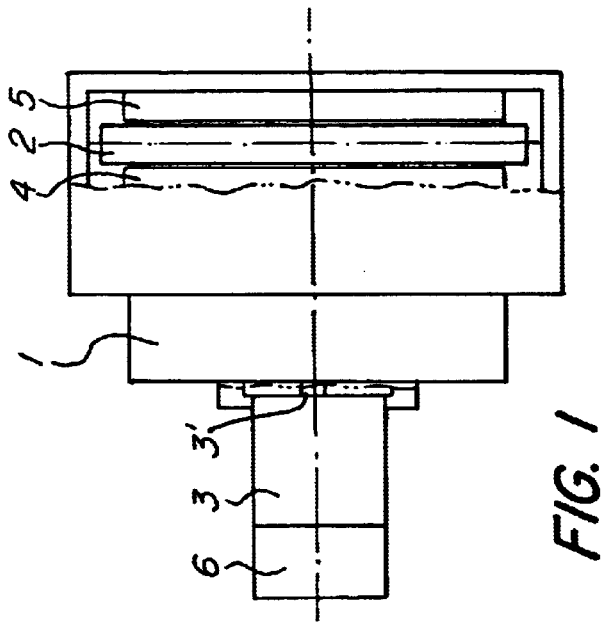
FIG. 1 is a schematic illustration of a vehicle disc brake arrangement embodying the invention.

A vehicle disc brake arrangement is shown in FIG. 1. A disc brake caliper 1 is mounted in a vehicle underframe (not shown) astraddle of a brake disc 2 on a vehicle axle (not shown). An electric motor 3 with a rotative drive shaft 3' is mounted in the caliper 1. Means, which are not further described here, are provided in the caliper 1 for transforming the rotative movement of the drive shaft 3' into a linear, brake applying movement of a first brake lining 4 for braking engagement with the brake disc 2. A second brake lining 5 is attached to the caliper 1.

The disc brake will accordingly be applied at the rotation of the electric motor 3 in one direction and released at the rotation in the opposite direction. The electric motor 3 thus acts as a normal service brake actuator.

The invention is concerned with a spring brake actuator 6, preferably for mounting on the electric motor 3, as is shown in FIG. 1. This actuator 6 can primarily be used as a parking brake actuator but also as an emergency actuator. Also, the actuator 6 can be used for adding brake force at a service brake application.

Figure 3:
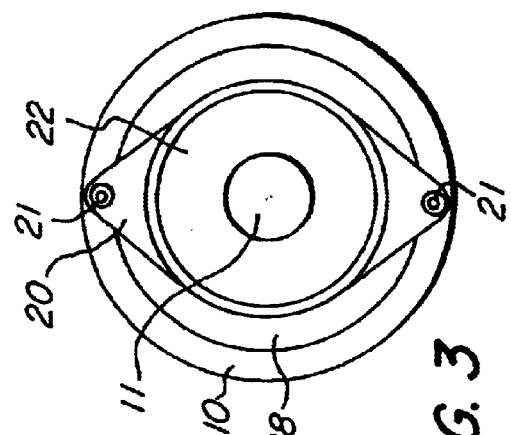
FIG. 3 is an end view from the left in FIG. 2 and to a smaller scale of the actuator of FIG. 2, and FIGS. 4 and 5 are schematic sectional illustrations of a second embodiment of a spring brake actuator according to the invention in two working positions.
Figure 2:
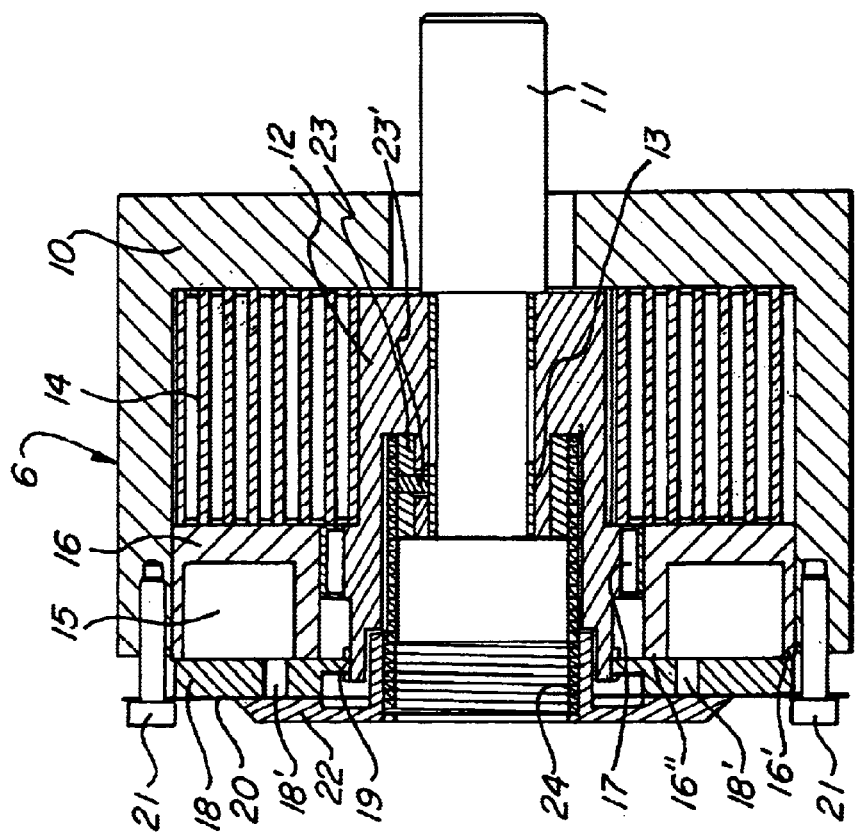
FIG. 2 is a sectional view of a spring brake actuator in the brake arrangement of FIG. 1.

The spring brake actuator 6 is shown in FIG. 2 (and also in an end view in FIG. 3).

The actuator 6 has a housing 10 for attachment to the end of the electric motor 3 in an appropriate way. An actuator shaft 11 is to be connected to the drive shaft 3' of the electric motor 3 and will accordingly rotate together therewith.

A generally cylindrical hub 12 is rotatably arranged on the shaft 11 by means of bushings 13. A strong clock spring or spiral spring 14 is arranged in the housing 10 coaxial with the shaft 11 with one of its ends attached to the housing 10 and the other end to the hub 12.

An electric coil 15 is arranged in a ring-shaped coil housing 16 attached in the housing 10. The coil 15 may be externally energized by an electric current at will. The hub 12 is journalled in the coil housing 16 by means of a bearing 17.

A brake disc 18 arranged axially outside the housing 10 and adjacent to the coil 15 is at 19 in splines engagement with the hub 12, so that the brake disc 18 rotates with the hub 12 but may move axially relative thereto.

A plate 20 is arranged externally of the brake disc 18 and is attached to the housing 10 by means of screws 21. A control disc 22 is in turn arranged externally of the plate 19.

There is a sleeve 23 with a pin 23' engaging a circumferential groove in the hub 12, so that a certain relative rotation of for example up to 15° between the hub 12 and the sleeve 23 may be admitted.

A locking spring 24 is arranged in such a way that its intermediate portion is in internal engagement with the shaft 11, its portion to the right in FIG. 2 in internal engagement with the sleeve 23 and its portion to the left in FIG. 2 in external engagement with the control disc 22.

The function of the device as shown and described is as follows:

Charging the Clock Spring 14

It is assumed that the clock spring 14 is in a relaxed state at the outset. The coil 15 is not energized.

At a release of the disc brake arrangement on which the spring brake actuator 6 is attached, the shaft 11 is rotated in a release direction. The locking spring 24 will transfer this rotation to the hub 12—and thus to the inner end of the clock spring 14 attached thereto—via the sleeve 23 and the pin 23'. Also the control disc 22 follows this rotation.

When a desired torque has been built up in the clock spring 14, the coil 15 is energized. Hereby a magnetic flux is formed attracting the brake disc 18 against end surfaces 16' and 16" of the coil housing 16, so that the rotation of the brake disc 18 is terminated by friction. This in turn means that the hub 12 is stopped.

By appropriate holes 18' in the brake disc 18 the magnetic flux is also diverted to the plate 20 and the control disc 22, which thus are attracted as well. This means that the control disc 22 is also rotationally locked.

The clock spring 14 is hereby charged or loaded for a future controlled delivery of rotational energy in the opposite rotational direction of the shaft 11 or in other words for application of the disc brake.

At a first rotational movement of the shaft 11 in the application direction the locking spring 24 will turn the sleeve 23, so that the pin 23' assumes its other position in relation to the hub 12.

Rotating the Shaft 11 Without Application of the Spring Brake Actuator 6

If the shaft 11 is rotated by the electric motor 3 for service application of the disc brake and with the coil 15 energized the locking spring 24 will follow the shaft 11 and slide internally on the sleeve 23 and externally in the control disc 22.

If on the other hand the shaft 11 is rotated in the opposite direction for service brake release the locking spring 23 is locked in the control disc 22, so that it has to slide internally in its intermediate portion against the shaft 11.

As long as the coil 15 is energized, normal service brake application and release by means of the service brake motor 3 is accordingly possible.

Applying the Spring Brake Actuator 6

When the coil 15 is deenergized, which may occur either at will for parking or service braking or for emergency braking when there is a disruption in the voltage supply, the friction engagement at 16' and 16" disappears, so that the brake disc 18 and the hub 12 start to rotate in the brake application direction under the action of the clock spring 14. As soon as the pin 23' has again shifted its position relative to the hub 12, also the sleeve 23 and the shaft 11 will follow the rotation by means of the locking spring 24.

After the spring brake application the above described operation for charging the clock spring 14 by rotation of the shaft 11 in the release direction and with the coil 15 deenergized will have to be repeated.

Modifications

In the preferred embodiment as described above and shown in the drawing, the spring brake actuator 6 is mounted on the electric motor 3 with its shaft 11 connected to the drive shaft 3' of the motor so as to rotate therewith. One obvious modification of the arrangement shown in. FIG. 1 is to position the spring brake actuator between the caliper 1 and the electric motor 3. As another possible modification the spring brake actuator shaft may be connected to another rotating part in the disc brake caliper, where the rotational speed preferably is somewhat lower.

The provision of the sleeve 23 with its pin 23' is only one example of a way to obtain the desired function of allowing free rotation of the shaft 11 in relation to the hub 12 in spite of the existence of the locking spring 24 for their rotational connection. Another example, which may be used in practice, is to delete said sleeve with its pin and to provide the hub 12 in the region for the locking spring 24 with a portion with a slightly reduced diameter.

It has to be pointed out that the shown and described embodiment may be changed in constructional details, for example with regard to the journalling of the different rotational parts. Also, the control disc 22 may be divided into two parts in splines engagement with each other.

The spring brake actuator has been described mainly in its use as a parking and emergency actuator. However, it may also be used as a supplementary service brake actuator. In this case the normal service brake actuator may be dimensioned to provide the power for normal brake applications, but when a higher power is needed, the power from the spring brake actuator may be added. In this way the service brake actuator may be given smaller dimensions.

A Second Embodiment

Figure 5:
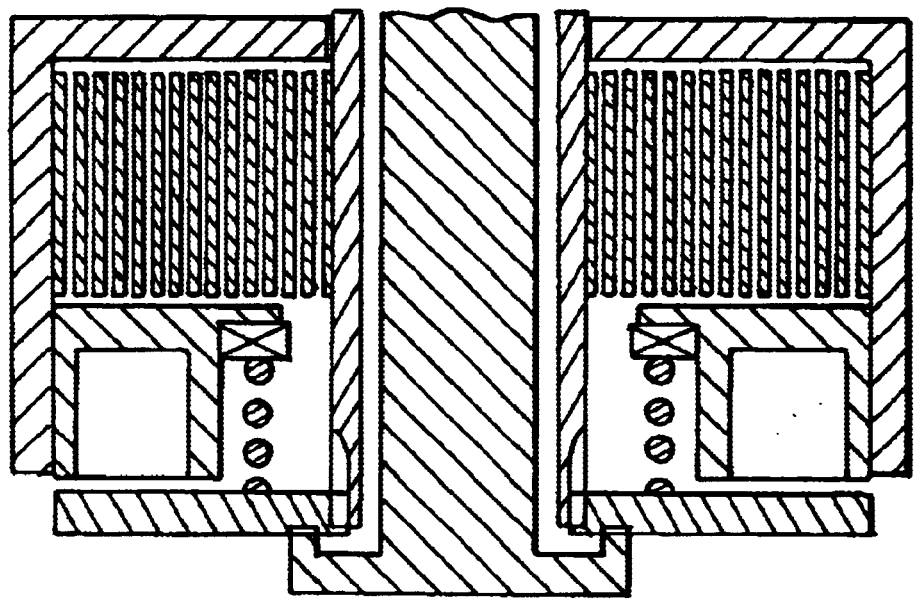
Figure 4:
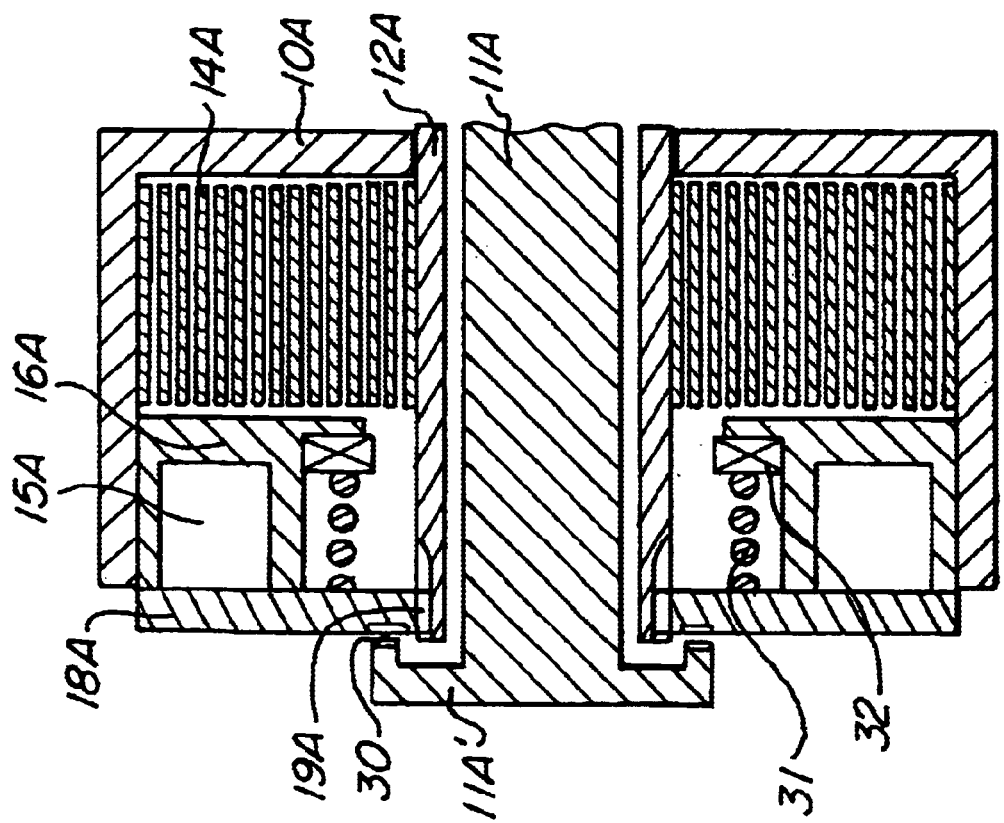

A second embodiment is shown in FIGS. 4 and 5. Parts that are similar to corresponding parts in the embodiment of FIGS. 1–3 are given the same reference numerals with the addition of "A". For the sake of clarity only FIG. 4 is provided with reference numerals.

Thus, in FIG. 4 we find an actuator housing 10A, an actuator shaft 11A, a hub 12A, a clock spring or spiral spring 14A (connected to the housing and the hub), an electric coil 15A, a coil housing 16A (attached to the housing 10A), and a brake disc 18A in splines engagement with the hub at 19A.

The actuator shaft 11A is provided with an end flange 11A for possible engagement with the brake disc 18A by means of a tooth clutch 30. The brake disc 18A is biassed to the left in the drawing by a compression spring 31 resting on the coil housing 16A via an axial bearing 32.

FIG. 4 shows a position with the coil 15A energized and the tooth clutch 30 disengaged, whereas in FIG. 5 the coil 15A is deenergized and the tooth clutch engaged.

Starting from a situation with the spring 14A relaxed and the coil 15A deenergized (FIG. 5), a brake release rotation of the actuator shaft 11A can wind up or energize the spring 14A via the tooth clutch 30 the brake disc 18A, the splines 19A, and the hub 12A.

The coil 15A is energized, when a desired torque has been built up in the spring 14A (FIG. 4), which means that the tooth clutch 30 is disengaged, leaving the actuator shaft 11A free to rotate in either direction, and that the brake disc 18A (and thus the hub 12A) is frictionally held against rotation.

If the coil 15A is again deenergized (FIG. 5), the brake disc 15A will be biassed into engagement with the actuator shaft flange 11A' via the tooth clutch 30, so that the brake shaft 11A is rotated in the brake application direction.

This embodiment may be utilized in the same way as the first embodiment.

What is claimed is:

1. A spring brake actuator for use in conjunction with a service brake actuator having a rotational operative shaft, the spring brake actuator having an actuator shaft in rotative communication with the service brake actuator shaft, characterized by
    a clock spring or spiral spring, attached at its outer end to a spring brake actuator housing and mechanically charged at a rotation of the actuator shaft in a brake release direction,
    an electric coil for keeping—when electrically energized—the clock spring in its charged condition, and
    transfer means for transferring the rotative energy of the clock spring to the actuator shaft in a brake applying direction, when the coil is deenergized, but allowing free rotation of the shaft in either direction, when the coil is energized.

2. A spring brake actuator according to claim 1, characterized in that the transfer means include
    a cylindrical hub, which is rotationally arranged in relation to the shaft and to which the inner end of the clock spring is attached,
    a locking spring connecting the hub with the shaft, and
    control means for controlling the operational condition of the locking spring in relation to the hub by means of the coil.

3. A spring brake actuator according to claim 2, characterized in that the control means include in axial order
    a brake disc in proximity to the coil and in splines engagement with the hub, and
    a control disc in internal engagement with the locking spring.

4. A spring brake actuator according to claim 2, characterized in that the locking spring is connected to the hub by means of a sleeve having circumferential play in relation to the hub.

5. A spring brake actuator according to claim 4, characterized in that the sleeve has a pin engaging a circumferential groove in the hub.

6. A spring brake actuator according to claim 1, characterized in that the transfer means include
    a cylindrical hub, which is rotationally arranged in relation to the shaft and to which the inner end of the clock spring is attached,
    an axially movable brake disc in splines engagement with the hub, and
    a tooth clutch between the actuator shaft and the brake disc, the clutch being engaged when the coil is not energized.

7. A spring brake actuator according to claim 6, characterized in that the tooth clutch is spring biased into engagement.

* * * * *